United States Patent [19]
Frezza et al.

[11] Patent Number: 4,712,239
[45] Date of Patent: Dec. 8, 1987

[54] SECURITY ARRANGEMENT FOR DOWNLOADABLE CABLE TELEVISION CONVERTERS

[75] Inventors: William Frezza, Warminster; Robert Simons, Lansdale; Richard Westerfer, Norristown, all of Pa.

[73] Assignee: General Instrument Corporation, New York, N.Y.

[21] Appl. No.: 874,845

[22] Filed: Jun. 16, 1986

[51] Int. Cl.$^4$ .................... H04N 7/167; H04L 9/00
[52] U.S. Cl. ................................ 380/20; 358/349; 380/13; 380/49; 455/4
[58] Field of Search ................. 380/20, 13, 49; 358/349; 455/4

[56] References Cited
U.S. PATENT DOCUMENTS 4,054,911 10/1977 Fletcher et al. .................. 358/86
4,542,407 9/1985 Cooper et al. .................... 380/20
4,558,464 12/1985 O'Brien ............................ 380/20

Primary Examiner—Stephen C. Buczinski
Attorney, Agent, or Firm—Barry R. Lipsitz, Esq.

[57] ABSTRACT

A method and apparatus prevent unauthorized programming viewing via a downloadable cable television converter. A booter checksum is computed from data contained in a downloaded booter image. A valid checksum is extracted from tag data associated with a scrambled program signal transmitted on the cable system. The booter checksum is compared to the extracted valid checksum. If the booter checksum and valid checksums match, a descrambler is enabled to descramble the scrambled program signal. If the checksums do not match, the descrambler is not enabled. In this manner, a pirate is prevented from downloading a false booter image to defeat the integrity of the converter.

11 Claims, 1 Drawing Figure

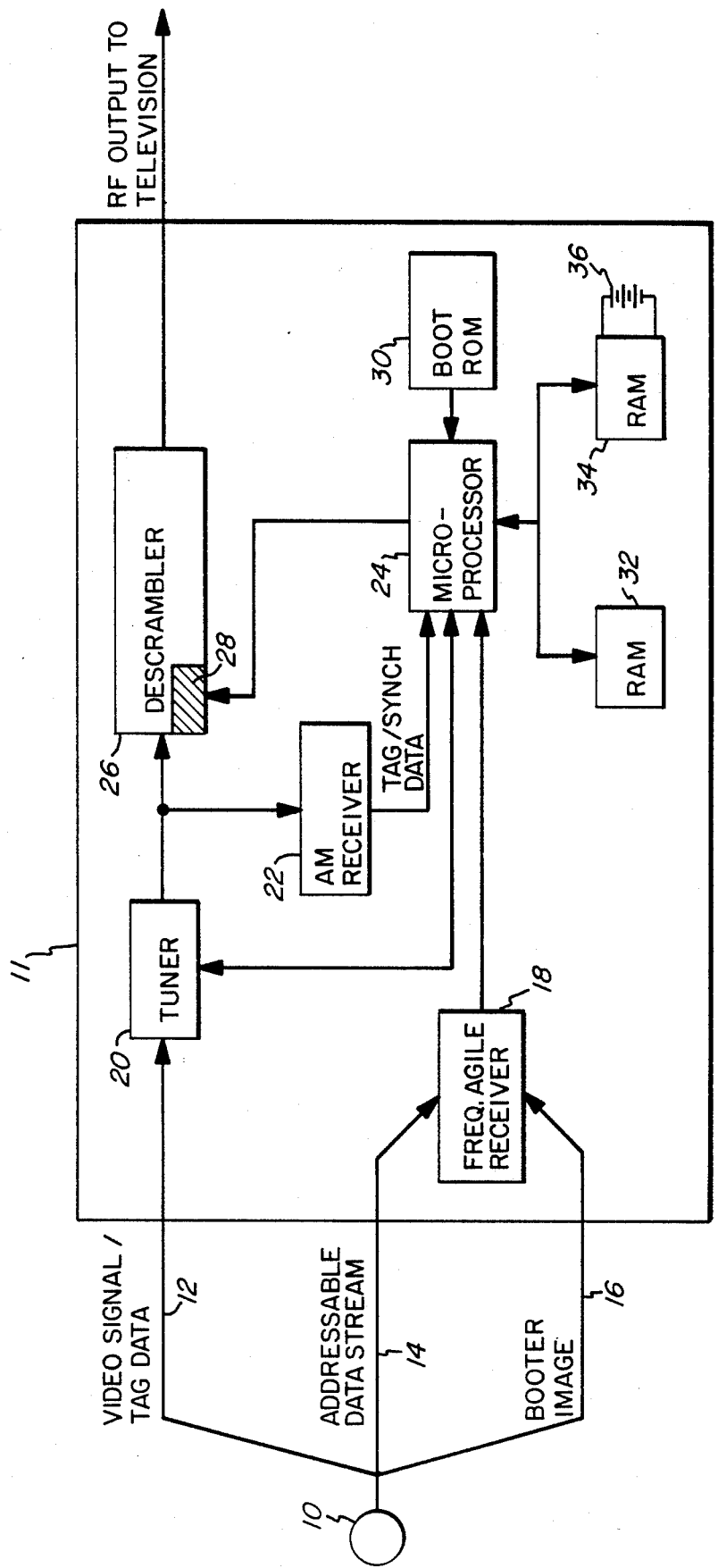

SECURITY ARRANGEMENT FOR DOWNLOADABLE CABLE TELEVISION CONVERTERS

FIELD OF THE INVENTION:

This invention relates to cable television systems using downloadable converters, and more particularly, to a method and apparatus for preventing unauthorized parties from illegitimate access to cable television programs.

BACKGROUND OF THE INVENTION:

Cable television (CATV) systems which provide access to regular television programming and "premium" or "pay-per-view" programming are well known. It has long been desirable to introduce fully downloadable CATV converters which can accept all of their operating software from a booter channel upon power up. Downloadable converters are easier to maintain than known read only memory (ROM) based products, and provide the additional advantage of allowing field upgradeability and customization as new features are introduced in a cable television system. Further, downloadable converters can serve as an essential bridge, via emulation software, for systems which wish to retire older products in a phased manner.

One important obstacle that has prevented the development of one-way CATV systems with downloadable converters is the issue of software security. For example, a "pirate" booter image could be loaded into a converter (e.g., by a subscriber who wants to receive premium channels without paying), which could defeat the integrity of the converter by permitting all video programs to be unscrambled without permission. This problem has been solved in a two-way CATV system using a technique described in co-pending, commonly assigned U.S. patent application Ser. No. 726,676, filed Apr. 24, 1985, entitled "Bootstrap Channel Security Arrangement for Communication Network", and incorporated herein by reference. In the apparatus and method disclosed in the co-pending application, software is downloaded on a booter channel via a communication network. A subscriber terminal coupled to the network initiates a communication with the network to receive downloaded booter data. The downloaded data is stored, and a checksum is computed from at least a portion of the downloaded data. The checksum is tested for validity, and control of the subscriber terminal is released to the downloaded software only if the checksum is valid.

It would be advantageous to provide a method and apparatus for securing the booter image in one-way CATV systems. In one-way systems, there is no ability to transfer a computed checksum back to the headend for verification. Thus, a system must be provided wherein verification of the booter image occurs at the subscriber converter, and wherein an illegitimate booter image prevents the converter from enabling the viewing of an unauthorized program. The present invention relates to such an apparatus and method.

SUMMARY OF THE INVENTION

In accordance with the present invention, the booter image on a one-way CATV system using downloadable converters is secured to prevent unauthorized receipt of programming. In one embodiment, the video descrambling process is disabled unless a valid checksum is computed from the downloaded booter image. Such apparatus includes means for computing a booter checksum from data contained in a downloaded booter image. Means, coupled to receive a program signal, extract a valid checksum from tag data associated with the signal. The booter checksum is compared to the extracted valid checksum, and if a match is found, a descrambler is enabled to unscramble the program signal.

Means can be provided for storing the booter checksum after it is computed at the converter. The storing means can then be inhibited from storing another checksum until a new booter image is downloaded.

In accordance with the method of the present invention, unauthorized parties are precluded from obtaining illegitimate access to cable television programs in a cable system in which a booter image is downloaded to subscriber converters. A booter checksum is computed from booter image data downloaded to a subscriber converter. The booter checksum is compared to a valid checksum extracted from data associated with a television signal received via the cable system. A subscriber is prevented from viewing a scrambled program unless the checksum computed from the booter image matches the valid checksum. The booter image and valid checksum data can be changed on a periodic basis to further frustrate the efforts of a pirate who attempts to overcome the checksum security feature.

BRIEF DESCRIPTION OF THE DRAWING

The FIGURE is a block diagram illustrating the pertinent parts of a CATV converter/descrambler in accordance with the present invention.

DETAILED DESCRIPTION OF THE INVENTION

The present invention provides security for a booter image downloaded to a cable television converter from a cable television system headend.

As diagrammatically shown in the FIGURE, a cable television converter 11 is coupled to a cable television system via an input terminal 10. The cable system carries various signals, including a video signal which can have tag data associated therewith as illustrated by line 12, and an addressable data stream as illustrated by line 14. The provision of the video signal/tag data and addressable data stream are conventional, and have been used in conjunction with known cable television converters such as that manufactured by the Jerrold Division of General Instrument Corporation and designated as Model No. DRZN-3A.

In accordance with the present invention, an additional signal is transmitted via the cable system in the form of a booter image, designated by line 16 in the FIGURE. Like the addressable data stream, which is typically delivered via a 14 kilobit per second (kb/s) FM data stream, the booter image is transmitted via a second FM data stream that is added to the cable system and dedicated to the booter image. This "booter channel" cyclically transmits operating software to the converter. A frequency agile FM receiver 18 is provided in converter 11 to receive either the addressable data stream or the booter image from the cable system. When converter 11 is powered up, an initialization program stored in the "BOOT ROM" 30 force tunes receiver 18 (via microprocessor 24) to the booter channel on which the incoming booter image appears. The booter image is received by receiver 18 and the data (including the converter operating software) contained therein is loaded into the converter's random access memory (RAM) 32.

After downloading of the booter image is complete, receiver 18 is retuned to the channel which contains the addressable data stream. Data from the addressable data stream is stored, during the operation of converter 11 and in accordance with the operating software, in RAM 32 or RAM 34 via the converter's microprocessor 24. A battery 36 provides backup for RAM 34 in the event of a power failure, thereby maintaining the data stored in RAM 34.

Signals contained in the addressable data stream received by frequency agile receiver 18 are placed on the cable by the cable system operator to define, for example, which programs the subscriber using the converter is authorized to receive. The data detected by receiver 18 is transmitted to microprocessor 24 in a conventional manner.

Converter 11 includes a tuner 20 which is coupled to the incoming cable at input terminal 10. Tuner 20 is a dual conversion tuner which produces modulated video and audio carriers at its output for one of a plurality of channels transmitted over the cable. A subscriber selects a channel using a keyboard (not shown) coupled to microprocessor 24 or alternately, with a hand-held remote control unit (not shown) which interfaces with microprocessor 24 using, e.g., well-known infrared signal transmission means. Microprocessor 24 decodes the channel information and sends a signal to tuner 20 to tune in the selected channel.

The modulated carrier for the selected channel is passed from the output of tuner 20 to a descrambler 26, which may be of the gated RF synch suppression type, and to an AM receiver 22. The modulated carrier contains audio and video signals. In the case of a premium channel, the video signals are scrambled. AM receiver 22 detects the synchronization data for use by descrambler 26, and couples this data to microprocessor 24. Microprocessor 24 decodes the synchronization data from AM receiver 22 and forwards it to descrambler 26.

Descrambler 26 can comprise a descrambling universal logic array (ULA) which is programmed to perform the descrambling function. A special register 28 is provided in the descrambling ULA into which a booter checksum is loaded. The booter checksum is computed by microprocessor 24, in accordance with the boot ROM 30 software, from the booter image received during initialization by frequency agile receiver 18. Only one such load of a checksum into special register 28 is accepted per initialization. Thus, a downloaded booter image cannot write to special register 28 without initiating a re-boot. After special register 28 is loaded with the checksum computed from the booter image, control is turned over to the booter operating software downloaded into RAM 32.

Each program transmitted by the cable system operator includes tag data which is detected by AM receiver 22 and forwarded to microprocessor 24. In accordance with the present invention, the tag data (which may be transmitted either on the audio carrier or with the video signal of the transmitted program) will include a valid security checksum for all scrambled channels. The descrambling ULA of descrambler 26 extracts this valid checksum via microprocessor 24 and compares it to the one loaded into special register 28. If the checksum computed from the booter image ("booter checksum") matches the valid checksum extracted from the tag data, descrambler 26 is enabled and scrambled programs which the subscriber is authorized to receive are descrambled for viewing. If the booter checksum and valid checksum do not match, the descrambler will not descramble the video, thereby protecting the converter from pirates seeking to enable the descrambler using an illegitimate booter image.

It will now be understood that the present invention secures downloadable CATV converters against pirates who attempt to enable descrambling of a scrambled program by downloading an illegitimate booter image to the converter. The CATV converter includes RAM memory for receiving downloaded software on a separate booter channel. The advantage of such a converter is that it is reprogrammable from the headend. A frequency agile FM receiver 18 is provided to capture the booter image upon initialization of the converter when it is powered up. An initialization program stored in boot ROM 30, operating in conjunction with microprocessor 24, computes a checksum from the downloaded booter image. This checksum is stored in a special checksum register 28 prior to turning control of the converter over to the downloaded booter image software.

In operation, the descrambler 26 compares the contents of the special checksum register to a transmitted program checksum carried in program tag data. Descrambling is enabled only if the checksums match. Hardwired logic in the descrambler ULA prevents the downloaded program from changing the contents of the checksum register. In this manner, a pirate is prevented from downloading a false booter image to defeat the integrity of the converter.

We claim:

1. Apparatus for preventing unauthorized receipt of programming in a downloadable cable television converter comprising:

receiver means for receiving data downloaded via a cable televison network;

means for automatically tuning said receiver means to a dedicated booter channel for receipt of data comprising a booter image when said converter is powered up;

means for subsequently tuning said receiver means to a separate channel for receipt of additional data after receipt of said booter image;

means for computing a booter checksum from data contained in said booter image;

means, coupled to receive a program signal, for extracting a valid checksum from tag data associated with said signal;

means for comparing the booter checksum to said extracted valid checksum;

a descramber coupled to receive at least a portion of said program signal to be descrambled; and means operatively associated with said descrambler for enabling the descrambler to operate only if said comparing means determines that the booter checksum matches the extracted valid checksum.

2. The apparatus of claim 1 further comprising:

means for storing the booter checksum;

means for coupling said storing means to said comparing means; and means operatively associated with said comparing means for retrieving the booter checksum from the storing means for comparing with the extracted valid checksum.

3. The apparatus of claim 2 wherein said booter checksum is computered and stored upon downloading of the booter image, said apparatus further comprising:

means for inhibiting said storing means from storing another checksum until a booter image is again downloaded.

4. A television communication system comprising:

a transmission path for carrying television signals from a headend to subscriber converters;

means for downloading a booter image to a subscriber converter via said transmission path, said converter comprising receiver means for receiving downloaded data, means for automatically tuning said receiver means to a dedicated booter channel for receipt of said booter image when the converter is powered up, and means for subsequently tuning said receiver means to a separate channel for receipt of additional data after receipt of said booter image;

means for computing a booter checksum from said booter image;

means for extracting a valid checksum from tag data contained in a televison signal received at said converter;

means for comparing the booter checksum to the extracted valid checksum;

a descrambler operatively associated with said converter for descrambling television signals; and means operatively associated with said descrambler for enabling the descrambler to operate only if said comparing means determines that the booter checksum matches the extracted valid checksum.

5. The communication system of claim 4 wherein said converter comprises:

second receiver means for receiving television signals.

6. The communication system of claim 4 wherein said receiver means is an FM receiver.

7. A cable television converter comprising:

first receiver means for receiving a booter image to be downloaded to the converter from a dedicated booter channel;

second receiver means for receiving television signals;

means for tuning said first receiver means upon power up to said booter channel to effect a booter image download;

means for subsequently tuning said first receiver means to a separate channel for receipt of additional data after receipt of said booter image;

means for computing a booter checksum from data contained in a downloaded booter image;

means coupled to said second receiver means for extracting a valid checksum from data associated with a received television signal;

means for comparing the booter checksum to the extracted valid checksum; and means for preventing a user from viewing a program to be reproduced from a received television signal if said comparing means determines that the booter checksum does not match the extracted valid checksum.

8. The cable television converter of claim 7 further comprising:

a descrambler coupled to receive and descramble television signals from said second receiver;

said preventing means operatively associated with said descrambler to inhibit the operation of the descrambler if the booter checksum and valid checksum do not match.

9. The communication system of claim 7 wherein said first receiver means is an FM receiver.

10. A method for preventing unauthorized parties from illegitimate access to cable television programs in a cable system in which a booter image is downloaded to subscriber converters, comprising the steps of:

tuning a data receiver in a subscriber terminal to a booter channel to receive downloaded booter image data;

re-tuning said data receive to a separate channel for receipt of additional data after receipt of said booter image data;

computing a booter checksum from said booter image data;

comparing the booter checksum to a valid checksum extracted from data associated with a television signal received by the subscriber converter via the cable system; and preventing a subscriber from viewing a program to be reproduced from a received television signal unless the checksum computed from the booter image matches the valid checksum.

11. The method of claim 10 comprising the further steps of:

downloading a booter image to said subscriber converter;

transmitting a television signal with associated valid checksum data to said subscriber converter; and changing the booter image and valid checksum data on a periodic basis.

* * * * *